United States Patent
Qin

(10) Patent No.: US 12,493,566 B2
(45) Date of Patent: Dec. 9, 2025

(54) DATA ACCESS METHOD AND COMPUTING DEVICE

(71) Applicant: Huawei Technologies Co., Ltd., Shenzhen (CN)

(72) Inventor: Guo Qin, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/677,298

(22) Filed: May 29, 2024

(65) Prior Publication Data

US 2024/0311314 A1    Sep. 19, 2024

Related U.S. Application Data

(63) Continuation of application No. PCT/CN2022/099520, filed on Jun. 17, 2022.

(30) Foreign Application Priority Data

Nov. 30, 2021    (CN) .......................... 202111441693.4

(51) Int. Cl.
*G06F 12/00* (2006.01)
*G06F 12/02* (2006.01)
*G06F 13/16* (2006.01)
*G06F 13/42* (2006.01)

(52) U.S. Cl.
CPC ...... *G06F 13/1642* (2013.01); *G06F 12/0246* (2013.01); *G06F 13/4221* (2013.01)

(58) Field of Classification Search
CPC ............. G06F 13/1642; G06F 12/0246; G06F 13/4221; G06F 3/0659; G06F 9/5016; G06F 13/1657; G06F 2212/284; G06F 2212/311; G06F 12/0868; G06F 13/4295; G06F 2209/509; G06F 2212/1016; G06F 2212/1056; G06F 2213/0026; G06F 13/4022; G06F 12/0877; G06F 12/023; G06F 16/27
USPC ......................................................... 711/154
See application file for complete search history.

(56) References Cited

U.S. PATENT DOCUMENTS

2010/0281208 A1* 11/2010 Yang ................... G06F 12/0868
                                                              711/E12.001
2016/0210062 A1    7/2016 Mccambridge et al.

FOREIGN PATENT DOCUMENTS

CN      112667562 A   *  4/2021
WO   WO-2020082813 A1  *  4/2020 ............. G06F 3/061

* cited by examiner

*Primary Examiner* — Mardochee Chery
(74) *Attorney, Agent, or Firm* — Conley Rose, P.C.

(57) ABSTRACT

After writing an access request into a first cache queue of a processor, a data processing unit (DPU) sends, in a Peripheral Component Interconnect Express (PCIe) point-to-point transmission mode, a first instruction to a storage device to which an identifier of the storage device points, where the first instruction instructs the storage device to obtain the access request from the first cache queue and execute the access request. The access request includes the identifier of the storage device to be accessed, and the storage device is connected to the processor and not directly connected to the DPU. The first instruction includes location information of the access request in the first cache queue.

21 Claims, 11 Drawing Sheets

DATA ACCESS METHOD AND COMPUTING DEVICE

CROSS-REFERENCE TO RELATED APPLICATIONS

This is a continuation of International Patent Application No. PCT/CN2022/099520 filed on Jun. 17, 2022, which claims priority to Chinese Patent Application No. 202111441693.4 filed on Nov. 30, 2021. The disclosures of the aforementioned applications are hereby incorporated by reference in their entireties.

TECHNICAL FIELD

This disclosure relates to the field of data storage, and in particular, to a data access method and a computing device.

BACKGROUND

With continuous innovation, improvement, and accelerated evolution of data storage technologies, an implementation mechanism of data storage becomes increasingly complex. Data storage is usually executed by a host-side central processing unit (CPU) accessing a host-side storage device. An execution process continuously occupies and consumes processor resources. It may be understood that, working time of the processor purchased at high costs achieves a better gain when being used to undertake a high-value computing task, and it is clear that using the processor to undertake a data storage implementation work is not a preferential solution.

Based on this, another technology proposes to add a data processing unit (DPU) connected to a host-side processor, to access the host-side storage device to perform a data storage work originally completed by the host-side processor. In this way, the processor may invest as much computing power as possible in a computing service such as a virtual machine running on the processor. However, the DPU is usually disposed outside a host, and hardware needs to be improved, so that the DPU can exchange data with the host-side storage device. The other technology proposes to connect a host-side hardware storage device to the DPU in a hardware cable connection manner, so that the DPU may access the hardware storage device of the host. However, setting a hardware cable increases hardware design complexity of the DPU.

SUMMARY

In view of this, a data access method and a computing device are provided. The data access method in embodiments of this disclosure is performed by a DPU of the computing device. According to the data access method in embodiments of this disclosure, a hardware connection manner is simplified and hardware design complexity is reduced while it is ensured that the DPU can directly access a host-side hardware storage device.

According to a first aspect, an embodiment of this disclosure provides a data access method, where the method is performed by a DPU connected to a processor, and the method includes: writing an access request into a first cache queue of the processor, where the access request includes an identifier of a storage device to be accessed, and the storage device is connected to the processor and not directly connected to the DPU; and sending, in a Peripheral Component Interconnect Express (PCIe) point-to-point transmission mode, a first instruction to the storage device to which the identifier of the storage device points, where the first instruction includes location information of the access request in the first cache queue, and the first instruction instructs the storage device to obtain the access request from the first cache queue and execute the access request.

According to the data access method in this embodiment of this disclosure, the DPU is first used to write, into the first cache queue of the processor, the access request including the identifier of the storage device to be accessed, so that the access request may be stored in the first cache queue of the processor. Then the first instruction is sent, in the PCIe point-to-point transmission mode, to the storage device to which the identifier of the storage device points, so that the storage device to be accessed can receive the first instruction. The first instruction includes the location information of the access request in the first cache queue, and the first instruction instructs the storage device to obtain the access request from the first cache queue and execute the access request, so that after receiving the first instruction, the storage device can obtain the access request from a corresponding location in the first cache queue and execute the access request according to an instruction of the first instruction. In this manner, when the storage device is connected to the processor and not directly connected to the DPU, the DPU does not need to access the storage device via the processor of a host, and can directly access the storage device connected to the processor, so that resources of the host are not occupied. In addition, this access manner can simplify a hardware connection manner and reduce hardware design complexity.

According to the first aspect, in a first possible implementation of the data access method, the access request further includes a type of the access request and an access memory address, the access memory address is an address allocated by the processor to a memory of the DPU, the type of the access request indicates that the access request is a read request or a write request, and the access memory address is an address accessible to the storage device.

In this manner, when obtaining the access request from the first cache queue, the storage device may determine the type of the access request and address information of an access object, so that whether to perform a read operation or a write operation can be determined based on the type of the access request, and when executing the access request, data access by the DPU to the storage device of a corresponding operation type is completed based on the address information of the access object.

According to the first aspect or the first possible implementation of the first aspect, in a second possible implementation of the data access method, the method further includes: obtaining an execution result of the access request from a second cache queue of the processor.

Because the DPU is connected to the processor, the DPU can obtain the execution result of the access request from the second cache queue of the processor, to determine an execution status of the access request. The DPU does not need to cache the execution result of the access request, so that occupation of a storage space of the DPU can be reduced.

According to the first aspect or the first possible implementation of the first aspect, in a third possible implementation of the data access method, the method further includes: receiving an execution result that is of the access request and that is transmitted by the storage device in the PCIe point-to-point transmission mode.

In this manner, the execution result of the access request does not need to be transmitted by the storage device to the DPU via the processor, but is directly transmitted by the storage device to the DPU. This can improve transmission efficiency of the execution result of the access request.

According to any one of the first to third possible implementations of the first aspect, in a fourth possible implementation of the data access method, the method further includes: transmitting the address of the memory of the DPU to the processor; and receiving the access memory address from the processor.

In this manner, the DPU may obtain the access memory address accessible to the storage device, so that the access memory address can be used as an address for the DPU to transmit data in the PCIe point-to-point transmission mode and it is possible that the DPU and the storage device transmit data when the DPU and the storage device are not directly connected to each other.

According to any one of the first aspect and the foregoing possible implementations of the first aspect, in a fifth possible implementation of the data access method, the method further includes: receiving addresses of the first cache queue and the second cache queue that are sent by the processor, where the address of the first cache queue is used to write the access request into the first cache queue of the processor, and the address of the second cache queue is used to obtain the execution result of the access request from the second cache queue.

In this manner, the DPU can find the first cache queue based on the received address of the first cache queue, and when writing the access request into the first cache queue, the DPU may directly write the access request. The DPU can find the second cache queue based on the received address of the second cache queue, and when obtaining the execution result of the access request from the second cache queue, the DPU can directly obtain the execution result of the access request. Therefore, real-time performance and accuracy of writing the access request and obtaining an access request result are ensured.

According to a second aspect, an embodiment of this disclosure provides a data access method, where the method is applied to a computing device, and the computing device includes a processor, a storage device connected to the processor, and a DPU connected to the processor and not directly connected to the storage device. The method includes: the DPU writes an access request into a first cache queue of the processor, where the access request includes an identifier of the storage device to be accessed. The DPU sends, in a PCIe point-to-point transmission mode, a first instruction to the storage device to which the identifier of the storage device points, where the first instruction instructs a location of the access request in the first cache queue. The storage device obtains the access request from the first cache queue and executes the access request according to the first instruction.

According to the data access method in this embodiment of this disclosure, the DPU is first used to write, into the first cache queue of the processor, the access request including the identifier of the storage device to be accessed, so that the access request may be stored in the first cache queue of the processor. Then the DPU is used to send, in the PCIe point-to-point transmission mode, the first instruction to the storage device to which the identifier of the storage device points, so that the storage device to be accessed can receive the first instruction. The first instruction includes location information of the access request in the first cache queue, and the first instruction instructs the storage device to obtain the access request from the first cache queue and execute the access request, so that after receiving the first instruction, the storage device can obtain the access request from a corresponding location in the first cache queue and execute the access request according to an instruction of the first instruction. In this manner, in the computing device, when the storage device is connected to the processor and not directly connected to the DPU, the computing device does not need to access the storage device via the processor of a host, and can directly access the storage device connected to the processor, so that resources of the host are not occupied. In addition, this access manner can simplify a hardware connection manner and reduce hardware design complexity.

According to the second aspect, in a first possible implementation of the data access method, the access request further includes an access memory address, the access memory address is an address allocated by the processor to a memory of the DPU, and the access memory address is an address accessible to the storage device. Executing the access request includes: the storage device writes data into the memory of the DPU or reads data from the memory of the DPU based on the access memory address in the PCIe point-to-point transmission mode.

In this manner, the storage device can find an access object, that is, the memory of the DPU, based on the access memory address, so that the access request can be executed to write data into the memory of the DPU or read data from the memory of the DPU, to complete access by the memory of the DPU to the storage device.

According to the first possible implementation of the second aspect, in a second possible implementation of the data access method, the access request further includes a type of the access request, and the type of the access request indicates that the access request is a read request or a write request. When the access request is the read request, executing the access request includes: reading data from the storage device based on the access request, and writing, into the memory of the DPU based on the access memory address in the PCIe point-to-point transmission mode, the data read from the storage device. When the access request is the write request, executing the access request includes: obtaining, from the memory of the DPU based on the access memory address in the PCIe point-to-point transmission mode, data to be written into the storage device, and writing the obtained data into the storage device.

When the access request is the read request, the storage device can write data into the memory of the DPU, which is equivalent to reading the storage device by the memory of the DPU. When the access request is the write request, the storage device can read data from the memory of the DPU, which is equivalent to writing the storage device by the memory of the DPU. In this manner, corresponding to different types of the access request, the storage device can respond to different operations that meet a requirement of the access request.

According to the first or second possible implementation of the second aspect, in a third possible implementation of the data access method, the method further includes: the DPU sends the address of the memory of the DPU to the processor. The processor allocates the access memory address to the memory of the DPU based on the address of the memory of the DPU. The processor sends the access memory address to the DPU.

In this manner, the processor may allocate the access memory address to the memory of the DPU, so that the access memory address can be used as an address for the DPU to transmit data in the PCIe point-to-point transmission mode and it is possible that the DPU and the storage device transmit data when the DPU and the storage device are not directly connected to each other. Allocating the access memory address to the memory of the DPU and sending the access memory address may be performed in a configuration phase, so that the access memory address is directly used after software in the DPU generates the access request. This can improve efficiency of executing the access request by the computing device.

According to any one of the second aspect and the foregoing possible implementations of the second aspect, in a fourth possible implementation of the data access method, the method further includes: the storage device writes an execution result of the access request into a second cache queue of the processor. The DPU obtains the execution result of the access request from the second cache queue of the processor.

According to the second aspect and any one of the first to the third possible implementations of the second aspect, in a fifth possible implementation of the data access method, the method further includes: the DPU receives an execution result that is of the access request and that is transmitted by the storage device in the PCIe point-to-point transmission mode.

According to any one of the second aspect and the foregoing possible implementations of the second aspect, in a sixth possible implementation of the data access method, the method further includes: the DPU receives addresses of the first cache queue and the second cache queue that are sent by the processor, where the address of the first cache queue is used to write the access request into the first cache queue of the processor, and the address of the second cache queue is used to obtain the execution result of the access request from the second cache queue.

In this manner, the DPU can find the first cache queue based on the received address of the first cache queue, so that the DPU can accurately and quickly perform operations of writing the access request into the first cache queue and obtaining the execution result of the access request from the second cache queue. Creation of the first cache queue and the second cache queue and sending of the addresses of the first cache queue and the second cache queue may be performed in the configuration phase, so that the addresses of the first cache queue and the second cache queue are directly used after the software in the DPU generates the access request. This can improve the efficiency of executing the access request by the computing device.

According to a third aspect, an embodiment of this disclosure provides a computing device, including a processor, a storage device connected to the processor, and a DPU connected to the processor and not directly connected to the storage device. The DPU is configured to perform the data access method in one or more of the first aspect or the possible implementations of the first aspect.

According to a fourth aspect, an embodiment of this disclosure provides a non-volatile computer-readable storage medium, where the non-volatile computer-readable storage medium stores computer program instructions, and when the computer program instructions are executed by a processor, the data access method in one or more of the first aspect or the possible implementations of the first aspect is implemented.

According to a fifth aspect, an embodiment of this disclosure provides a computer program product including computer-readable code or a non-volatile computer-readable storage medium carrying the computer-readable code. When the computer-readable code is run in an electronic device, a processor in the electronic device performs the data access method in one or more of the first aspect or the possible implementations of the first aspect.

These aspects and other aspects of this disclosure are more concise and more comprehensive in descriptions of the following (a plurality of) embodiments.

BRIEF DESCRIPTION OF DRAWINGS

Accompanying drawings included in this specification and constituting a part of this specification and this specification jointly show example embodiments, features, and aspects of this disclosure, and are intended to explain principles of this disclosure.

DESCRIPTION OF EMBODIMENTS

Figure 1:
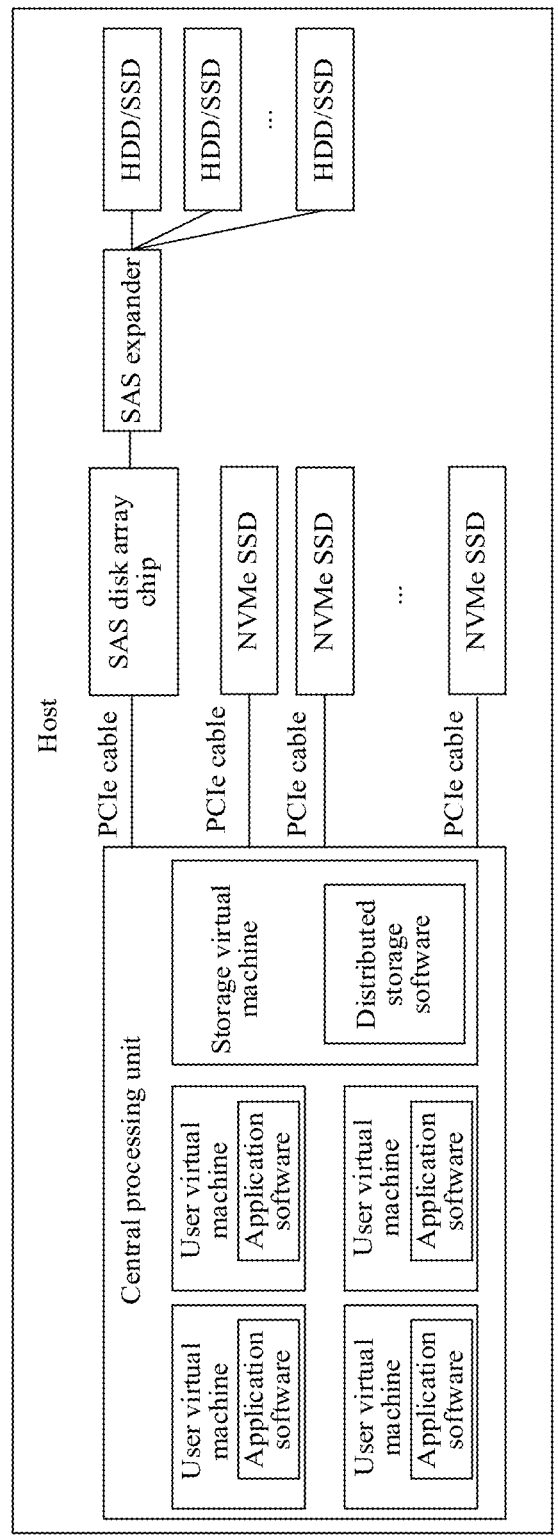
FIG. 1 shows an implementation of a data storage function of a computing device in another technology.

The following describes various example embodiments, features, and aspects of this disclosure in detail with reference to the accompanying drawings. Identical reference numerals in the accompanying drawings indicate components that have same or similar functions. Although various aspects of embodiments are illustrated in the accompanying drawings, the accompanying drawings are not necessarily drawn in proportion unless otherwise specified.

The specific term "example" herein means "used as an example, embodiment, or illustration". Any embodiment described as "example" is not necessarily explained as being superior or better than other embodiments.

In addition, numerous specific details are given in the following specific embodiments to better describe this disclosure. A person skilled in the art should understand that this disclosure may also be implemented without the specific details. In some embodiments, methods, means, components, and circuits well known by a person skilled in the art are not described in detail, so that a main purpose of this disclosure is highlighted.

FIG. 1 shows an implementation of a data storage function of a computing device in another technology. A computing device in an HCI is used as an example of the computing device shown in FIG. 1. The HCI is a technology that integrates virtualization computing and storage into a same system platform, and may integrate storage and computing functions into a single computing device (or a computing device cluster, where each computing device provides the computing and storage functions).

As shown in FIG. 1, for a specific computing device in the HCI, a host side of the computing device includes a processor (for example, a CPU), a Serial Attached Small Computer System Interface (SAS) expander, a SAS disk array chip, and a storage device. The storage device may include, for example, a SAS hard disk drive (SAS HDD)/ solid-state drive (SSD) and/or a Non-Volatile Memory Express (NVMe) SSD. The processor and the storage device NVMe SSD are connected through a PCIe cable, the processor is further connected to the SAS disk array chip through a PCIe cable, and the SAS disk array chip is further connected to the storage device HDD/SSD via the SAS expander.

The processor runs a storage virtual machine and a plurality of user virtual machines. The storage virtual machine further runs distributed storage software, and each user virtual machine further runs respective application software. The distributed storage software is used to send an access request to the host-side storage device. The processor may directly access the host-side storage device in a PCIe mode based on the access request, to provide a storage service for the application software in the user virtual machine.

A disadvantage of this solution is that completing a data storage function by the processor by accessing the storage device occupies a large quantity of processor resources, and consequently, a capability of the processor to support the user virtual machine is reduced.

Figure 2:
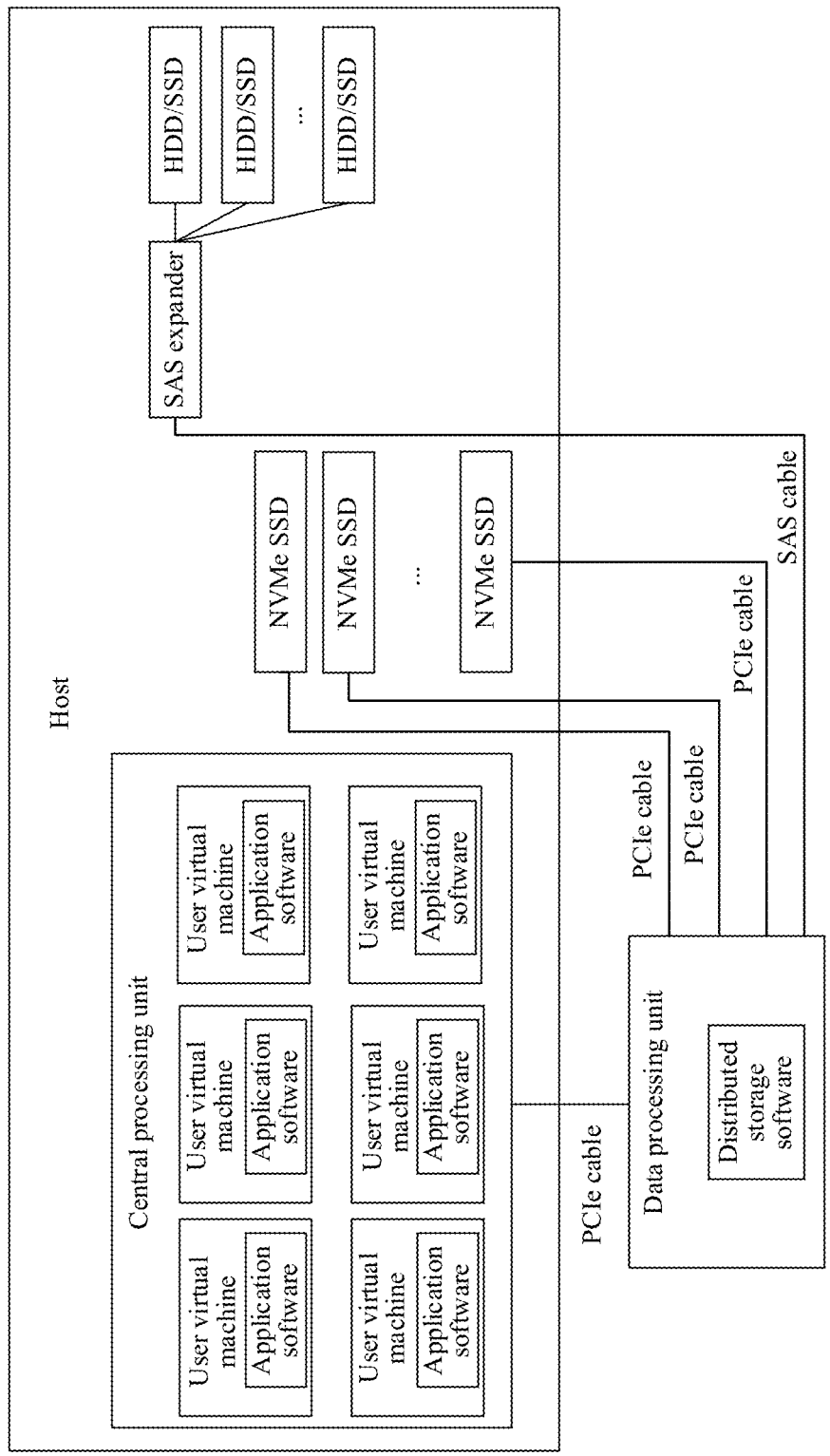
FIG. 2 shows another implementation of a data storage function of a computing device in another technology.

To release processing resources and memory of the host-side processor, improve density of the user virtual machine, and reduce system authorization costs, the other technology proposes an improved technical solution based on the solution in FIG. 1. FIG. 2 shows another implementation of a data storage function of a computing device in the other technology.

As shown in FIG. 2, a DPU is connected to a host-side processor (for example, a CPU) through a PCIe cable, and the DPU is used to replace the host-side processor to run distributed storage software, to provide a data storage service for application software in a user virtual machine in a host. In this way, as many processor computing capabilities as possible may be used to run the application software in the user virtual machine. In this case, a problem of how the DPU accesses a host-side storage device needs to be resolved.

The other technology proposes to connect the DPU to the host-side storage device in a hardware cable connection manner, so that the DPU can access the host-side storage device. The DPU may be connected to a storage device NVMe SSD through a PCIe cable, and the DPU may be connected to a storage device HDD/SSD through a SAS cable. However, this solution has the following requirements on a hardware facility of the DPU.

First, a SAS disk array chip is usually designed to be inserted into the processor. Therefore, the DPU needs to integrate a new SAS disk array chip to connect to a SAS expander. Second, the DPU is required to have plenty of PCIe ports, or needs to integrate a PCIe switch chip (which is not shown in the figure), to connect a plurality of memories NVMe SSDs via the PCIe ports or the PCIe switch chip.

Adding a cable and/or a chip brings problems such as extra power consumption, heat dissipation, space layout, and hardware costs to the DPU, and greatly increases complexity of a hardware connection manner and hardware design of the DPU.

In view of this, a data access method and a computing device are proposed. The data access method in embodiments of this disclosure is performed by a DPU of a computing device. According to the data access method in embodiments of this disclosure, the hardware connection manner is simplified and the hardware design complexity is reduced while it is ensured that the DPU can directly access a host-side hardware storage device.

Figure 3:
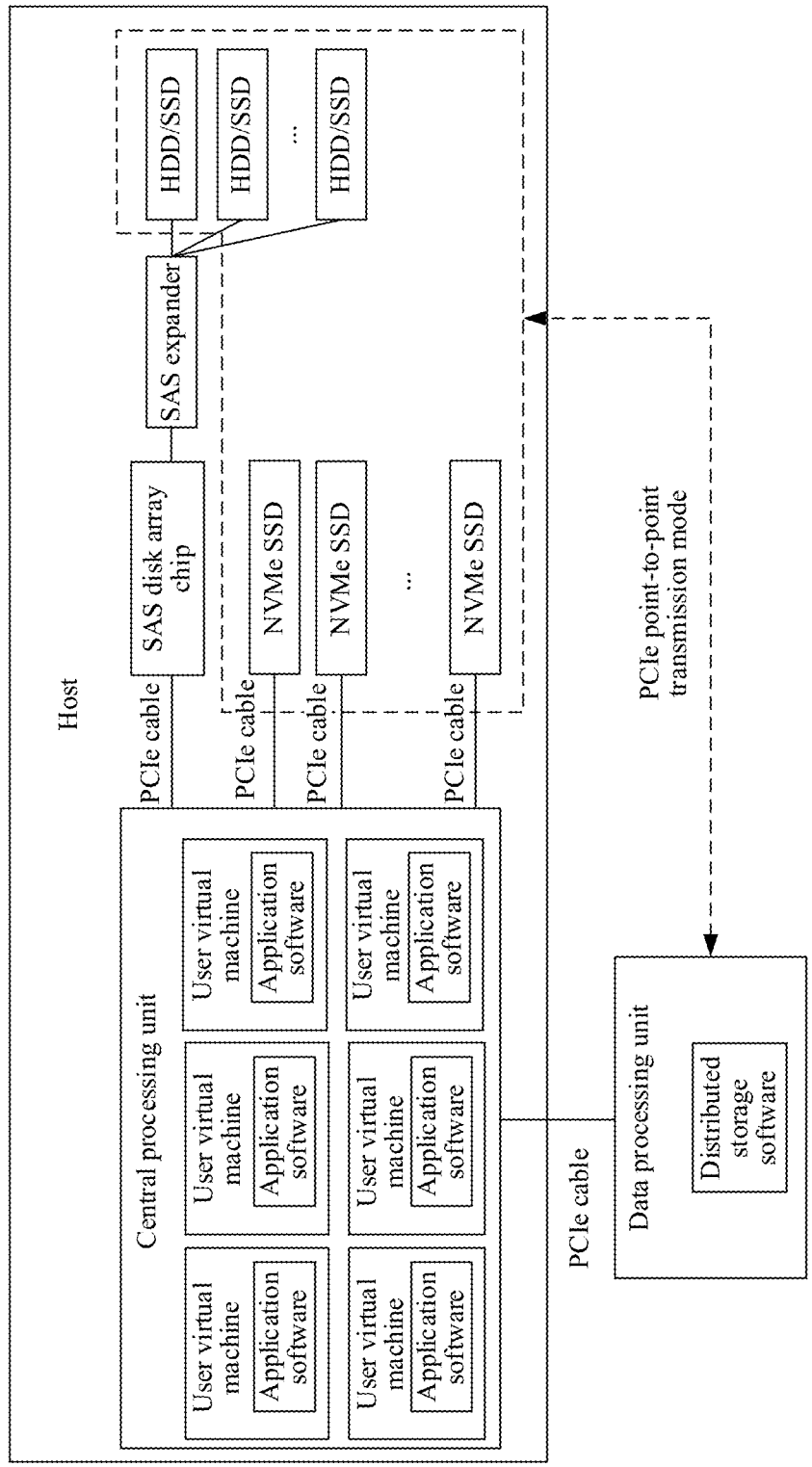
FIG. 3 shows an example application scenario of a computing device according to an embodiment of this disclosure.

FIG. 3 shows an example application scenario of a computing device according to an embodiment of this disclosure.

As shown in FIG. 3, a host side of the computing device in this embodiment of this disclosure includes a processor (for example, a CPU) and a plurality of memories (which may include a storage device NVMe SSD and a storage device HDD/SSD). A DPU is connected to the processor through a PCIe cable, and is not connected to each storage device. The DPU is not disposed on the host side of the computing device.

In a host, the processor may run at least one user virtual machine, and each user virtual machine further runs respective application software. The application software has a data storage requirement. The processor is connected to the storage device NVMe SSD through a PCIe cable, the processor is further connected to a SAS disk array chip through a PCIe cable, and the SAS disk array chip is further connected to the storage device HDD/SSD via a SAS expander.

The DPU may run distributed storage software. When the distributed storage software generates an access request, or when other software (which is not shown in the figure) run by the DPU generates the access request, the DPU performs the data access method in embodiments of this disclosure, and accesses the host-side storage device in a PCIe point-to-point transmission mode, to provide a data storage service for the application software in the user virtual machine of the host-side processor.

The computing device in FIG. 3 may be, for example, applied to an HCI, or may be applied to an application scenario in which another DPU accesses the host-side storage device when the DPU is connected to the host-side processor and not connected to the host-side storage device. A specific application scenario of the computing device is not limited in this embodiment of this disclosure.

Figure 4:
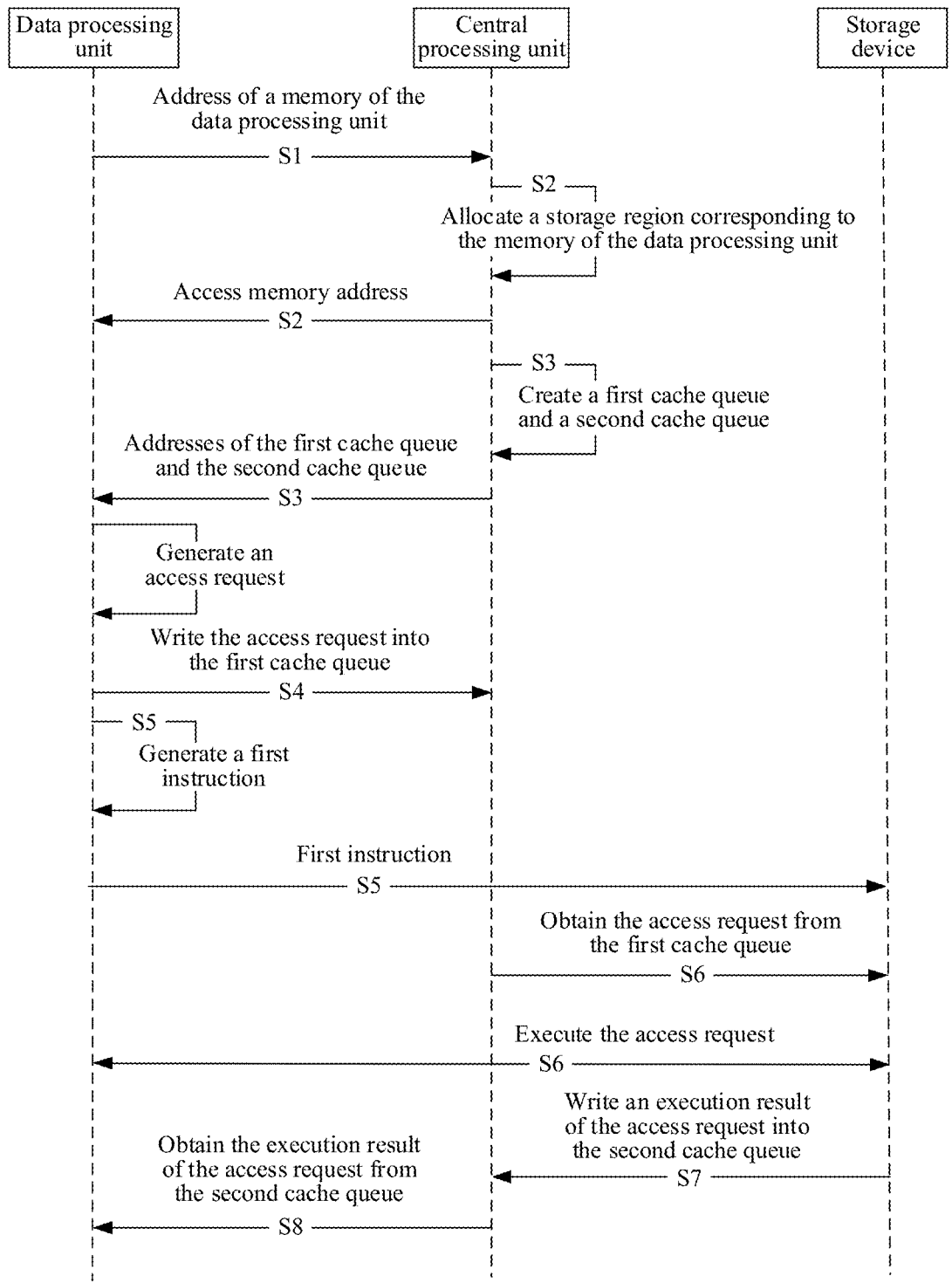
FIG. 4 shows an example working procedure of a computing device according to an embodiment of this disclosure.

FIG. 4 shows an example working procedure of a computing device according to an embodiment of this disclosure. With reference to FIG. 4, the following describes an example method for implementing access by a DPU to a host-side hardware storage device according to an embodiment of this disclosure.

The computing device in this embodiment of this disclosure may be first configured before being used by a user, so that in the computing device, the DPU may directly respond to an access request, and no apparatus or module in the computing device needs to be configured when the access request is generated to prepare for responding to the access request. To improve user experience as much as possible, the configuration may be completed, for example, before the computing device is delivered from a factory. When using the computing device, the user may perform various operations on application software run by a processor. Some operations may relate to reading and writing of data. In this case, the application software may generate a corresponding storage requirement. Based on the storage requirement of the application software, or based on the operations related to the reading and writing of data, the processor may indicate distributed storage software or other software (which is not shown in the figure) run by the DPU connected to the processor to generate the access request. In this case, the DPU may write the access request into a cache queue of the processor, so that the storage device can obtain the access request from the cache queue and execute the access request, to access the host-side hardware storage device.

As shown in FIG. 4, in the computing device according to this embodiment of this disclosure, before the distributed storage software generates the access request, the computing device may perform steps S1 to S3 to configure the DPU, the processor, and the storage device. After the DPU, the processor, and the storage device are configured, when the distributed storage software generates the access request, the computing device may perform steps S4 to S8, so that the DPU accesses the host-side hardware storage device.

With reference to FIG. 4, the following first describes an example method for configuring the DPU, the processor, and the storage device.

Figure 5:
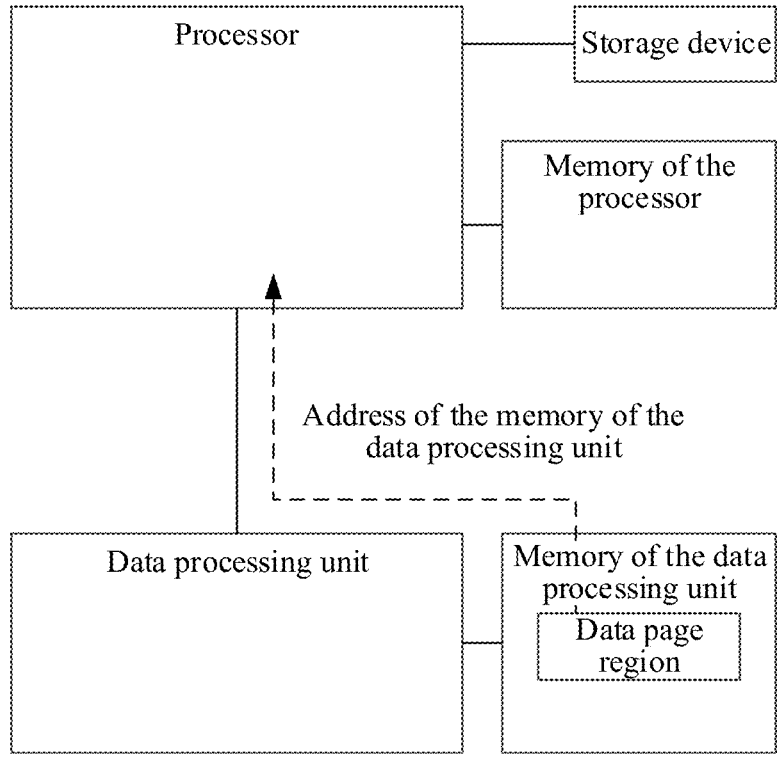
FIG. 5 shows an example in which a DPU sends an address of a memory of the DPU to a processor according to an embodiment of this disclosure.

Step S1: The DPU sends an address of a memory of the DPU to the processor. FIG. 5 shows an example in which the DPU sends the address of the memory of the DPU to the processor according to an embodiment of this disclosure.

For example, as shown in FIG. 5, the DPU includes the memory, used to store data that is used or generated when the DPU executes a task or instructions. The memory of the DPU may include a data page region, used to store data that may be written by the DPU into another apparatus or module (for example, the storage device) in the computing device, and data that is written by the another apparatus or module (for example, the storage device) in the computing device. The address of the memory of the DPU may be an address of the data page region. The storage device is disposed on a host side. Therefore, for the storage device, an object to which the storage device can transmit data in a PCIe point-to-point transmission mode should also have an address on the host side. However, the DPU is not disposed on the host side. Therefore, the address of the memory of the DPU is not an address on the host side, and cannot be used as an address of the object to which the storage device transmits data in the PCIe point-to-point transmission mode. Because the DPU is connected to the host-side processor, in step S1, the DPU may first send the address of the memory of the DPU to the host-side processor. The processor first performs processing to obtain an address (for example, refer to step S2 below) that is on the host side and that corresponds to the address of the memory of the DPU.

Figure 6:
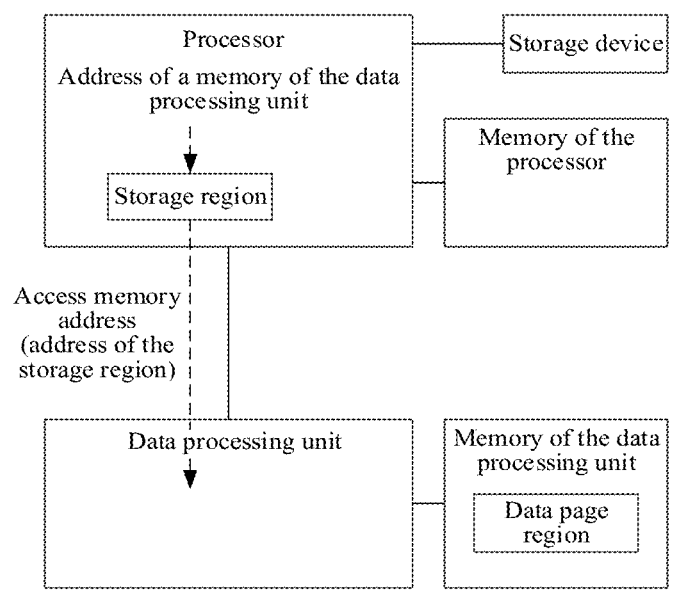
FIG. 6 shows an example in which a processor obtains an access memory address and sends the access memory address according to an embodiment of this disclosure.

Step S2: The processor allocates an access memory address to the memory of the DPU based on the address of the memory of the DPU, and sends the access memory address to the DPU. FIG. 6 shows an example in which the processor obtains the access memory address and sends the access memory address according to an embodiment of this disclosure.

For example, as shown in FIG. 6, the processor is disposed on the host side of the computing device. Therefore, an address generated by the processor is an address on the host side, and may be used as the address of the transmission object to which the storage device transmits data in the PCIe point-to-point transmission mode. Based on this, after receiving the address of the memory of the DPU, the processor may allocate, in a storage space of the processor, a corresponding storage region to the memory of the DPU, where the access memory address may be an address of the storage region. When the access memory address is used as the address of the object to which the storage device transmits data in the PCIe point-to-point transmission mode, the memory that is of the DPU and that corresponds to the storage region to which the access memory address belongs may be used as the transmission object to which the storage device transmits data in the PCIe point-to-point transmission mode, to establish a transmission channel in the PCIe point-to-point transmission mode between the storage device and the DPU. The access memory address may be used when data is transmitted between the DPU and the storage device in the PCIe point-to-point transmission mode (for example, refer to step S6 below).

Figure 7:
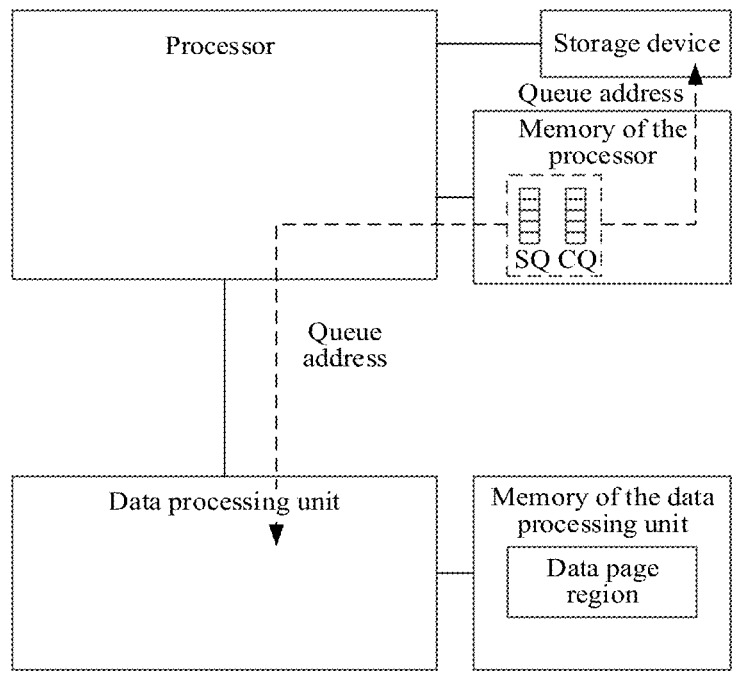
FIG. 7 shows an example in which a processor creates a cache queue and sends an address of the cache queue according to an embodiment of this disclosure.

Step S3: The processor creates a first cache queue and a second cache queue that correspond to the storage device, and sends storage addresses of the first cache queue and the second cache queue in the processor to the DPU and the storage device respectively. FIG. 7 shows an example in which the processor creates a cache queue and sends an address of the cache queue according to an embodiment of this disclosure.

For example, as shown in FIG. 7, the first cache queue may be a submission queue (SQ) used to store the access request, and the second cache queue may be a completion queue (CQ) used to store an execution result of the access request. The first cache queue and the second cache queue may be stored in a memory of the processor. The processor is connected to both the DPU and the storage device. Therefore, the storage addresses of the first cache queue and the second cache queue of the processor may be transmitted to the DPU and the storage device respectively. The DPU may write the access request into the first cache queue based on the storage address of the first cache queue in the processor (for example, refer to step S4 below), and may read the execution result of the access request from the second cache queue based on the storage address of the second cache queue in the processor (for example, refer to step S8 below). The storage device may read the access request from the first cache queue based on the storage address of the first cache queue in the processor (for example, refer to step S6 below), and may write the execution result of the access request into the second cache queue based on the storage address of the second cache queue in the processor (for example, refer to step S7 below). In this manner, the access request and the execution result of the access request may be transmitted between the DPU and the storage device.

Step S3 may be performed before step S1 or step S2, or may be performed simultaneously with step S1 or step S2. An execution sequence of step S3 and step S1 and an execution sequence of step S3 and step S2 are not limited in this disclosure.

After steps S1 to S3 are performed, the DPU, the processor, and the storage device have been configured. With reference to FIG. 4, the following describes an example method for implementing, by the computing device, that the DPU accesses the host-side hardware storage device after the DPU, the processor, and the storage device are configured.

Step S4: The DPU writes the access request into the first cache queue of the processor.

For example, in step S3, the DPU receives the storage address of the first cache queue. Therefore, a location of the first cache queue in the processor is known to the DPU. In this case, in the DPU, when the distributed storage software or the other software generates the access request, the DPU may write the access request into the first cache queue based on the address of the first cache queue.

Figure 8:
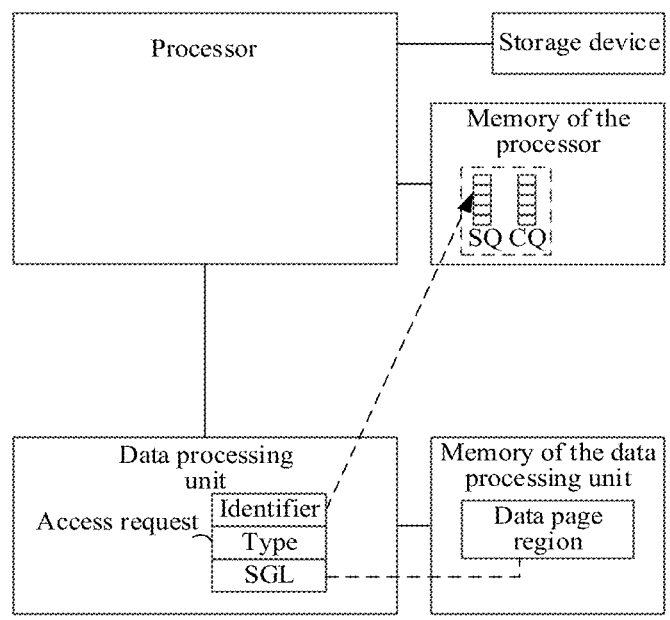
FIG. 8 shows an example in which a DPU writes an access request into a first cache queue of a processor according to an embodiment of this disclosure.

FIG. 8 shows an example in which the DPU writes the access request into the first cache queue of the processor according to an embodiment of this disclosure. As shown in FIG. 8, the DPU may first convert the access request into a form of an SQ (a first cache queue) entry (SQ (SQE)). The entry obtained through conversion may include operation code (operation code), a scatter gather list (scatter gather list (SGL)), an identifier, and the like. The first cache queue may include a plurality of entries. When the access request is written into the first cache queue of the processor, the entry obtained through conversion based on the access request may be written into a location of a specific entry (for example, an entry at a tail of a queue) in the first cache queue of the processor in a direct memory access (DMA) manner.

The operation code may indicate a type of the access request, and the access request may be classified into different types. For example, the access request may be a request of reading the storage device by the DPU (which is equivalent to transmitting data from the storage device to the DPU). In this case, the access request may be a read request, and the storage device performs a write operation when executing the access request, that is, the storage device writes data into the DPU (for example, refer to step S6 below). Alternatively, the access request may be a request of writing the storage device by the DPU (which is equivalent to transmitting data from the DPU to the storage device). In this case, the access request may be a write request, and the storage device performs a read operation when executing the access request, that is, the storage device reads data from the memory of the DPU (for example, refer to step S6 below). The operation code indicates the type of the access request, so that the type of the access request can be written into the first cache queue of the processor, and the storage device can obtain the type of the access request from the first cache queue, and determine whether execution of the access request is the read operation or the write operation.

The scatter gather list may store the access memory address. It can be learned from the related descriptions of step S2 that the access memory address may be used as the address of the transmission object to which the storage device transmits data in the PCIe point-to-point transmission mode. The access memory address is stored via the scatter gather list, so that the access memory address can be written into the first cache queue of the processor, and the storage device can find an object (in this example, the object is the data page region of the DPU) of the read operation or the write operation based on the access memory address when executing the access request.

The identifier may identify a storage device to be accessed. The storage device to be accessed may be any storage device of the host-side storage device. Each host-side storage device may correspond to one first cache queue. In this case, each first cache queue may also include an identifier of a storage device corresponding to the first cache queue. When the access request is written into the first cache queue of the processor, a first cache queue with the same identifier may be found from a plurality of first cache queues based on the identifier included in the access request, and then the access request is written into the first cache queue.

A person skilled in the art should understand that the entry obtained by converting the access request may include more content, for example, a length of the access request. Specific information included in the access request is not limited in this disclosure.

Step S5: The DPU generates a first instruction including location information of the access request in the first cache queue, and sends, in a PCIe point-to-point transmission mode, the first instruction to the storage device to which the identifier of the access request points, where the first instruction instructs the storage device to obtain the access request from the first cache queue and execute the access request.

The PCIe point-to-point transmission mode (that is, the PCIe point-to-point transmission mode) is an existing data transmission mode in the other technology, and may enable two devices to perform data transmission even when two devices are not directly connected. In this embodiment of this disclosure, the PCIe point-to-point transmission mode is used, so that the first instruction can be transmitted between the DPU and the storage device to be accessed that are not directly connected.

The storage device to be accessed that is used as a sending object of the first instruction may be the storage device corresponding to the identifier included in the access request in step S4. The first instruction may include the location information of the access request in the first cache queue, and the first instruction may instruct the storage device to obtain the access request from one first cache queue corresponding to the storage device and execute the access request. In other words, a specific queue from which the storage device obtains the access request is determined based on a correspondence between the first cache queue and the storage device. In this case, after receiving the first instruction, the storage device to be accessed may obtain the access request from a corresponding location in the one first cache queue corresponding to the storage device and then execute the access request according to an instruction of the first instruction.

Figure 9:
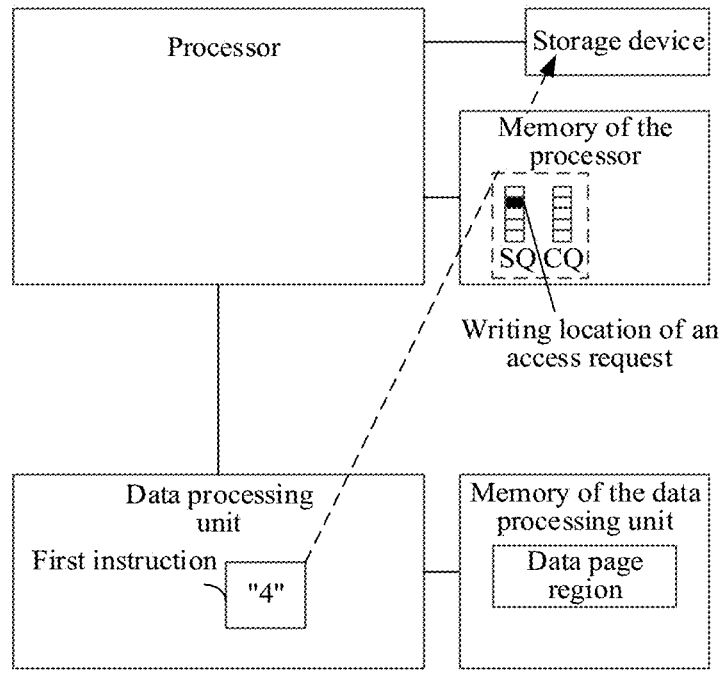
FIG. 9 shows an example in which a DPU generates a first instruction and sends the first instruction to a storage device according to an embodiment of this disclosure.

FIG. 9 shows an example in which the DPU generates the first instruction and sends the first instruction to the storage device according to an embodiment of this disclosure. As shown in FIG. 9, the location information of the access request in the first cache queue may be recorded via a pointer (doorbell), to obtain a pointer (that is, a doorbell address of the first cache queue) of the first cache queue. The first instruction may include the pointer of the first cache queue. For example, before step S4 is performed, the pointer of the first cache queue may be "3", indicating that a previously written access request is written into a $3^{rd}$ entry of the first cache queue. After step S4 is performed, the access request is newly written into a $4^{th}$ entry of the first cache queue. In this case, the pointer of the first cache queue may be updated to "4". In step S5, the processor may generate the first instruction, the pointer of the first cache queue included in the first instruction may be "4". The processor may send, to the storage device to be accessed, the first instruction including the pointer "4" of the first cache queue.

Step S6: The storage device obtains the access request from the first cache queue and executes the access request according to the instruction of the first instruction.

Figure 10:
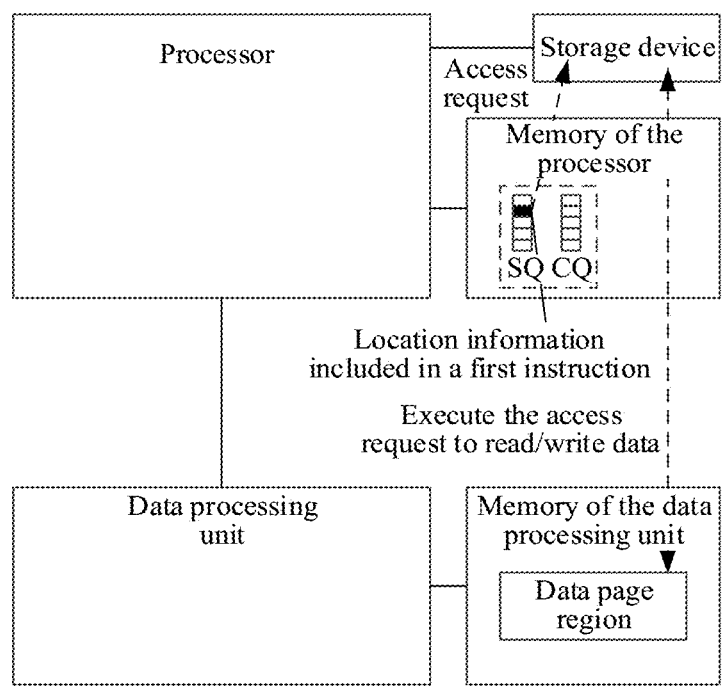
FIG. 10 shows an example in which a storage device obtains an access request and executes the access request according to an embodiment of this disclosure.

FIG. 10 shows an example in which the storage device obtains the access request and executes the access request according to an embodiment of this disclosure.

For example, as shown in FIG. 10, the storage device receives the first instruction from the processor, and the first instruction instructs the storage device to obtain the access request from the first cache queue and execute the access request. That pointer information of the first cache queue included in the first instruction is "4" is used as an example. According to the instruction of the first instruction, the storage device obtains the access request from a location of the $4^{th}$ entry in the first cache queue. With reference to related descriptions of step S5, the entry converted from the access request may be obtained.

The storage device may determine the type of the access request based on the operation code in the entry obtained through conversion. The storage device may determine, based on the scatter gather list in the entry obtained through conversion, the address (that is, the access memory address) of the object for data transmission in the PCIe point-to-point transmission mode. The storage device may execute the access request based on the type of the access request and the access memory address.

A manner in which the storage device executes the access request may be writing data into the memory of the DPU or reading data from the memory of the DPU based on the access memory address in the PCIe point-to-point transmission mode. When the type of the access request is the read request, the manner in which the storage device executes the access request may be reading data from the storage device based on the access request, and writing, into the memory of the DPU based on the access memory address in the PCIe point-to-point transmission mode, the data read from the storage device, for example, writing the data into the data page region of the memory of the DPU. When the type of the access request is the write request, the manner in which the storage device executes the access request may be obtaining, from the memory of the DPU based on the access memory address in the PCIe point-to-point transmission mode, data to be written into the storage device. For example, data may be obtained from the data page region of the memory of the DPU, and the obtained data is written into the storage device.

The access request may further include information for accessing a specific storage region of the storage device, for example, an identifier of a specific storage region of the storage device. When the type of the access request is the read request, data stored in a storage region corresponding to an identifier of a storage region included in the access request may be read from the storage device based on the access request. When the type of the access request is the write request, the obtained data may be written into the storage region that is in the storage device and that corresponds to the identifier of the storage region included in the access request.

Step S7: The storage device writes the execution result of the access request into the second cache queue of the processor.

The access request is generated by software such as the distributed storage software run by the DPU. Therefore, corresponding to the access request, the execution result of the access request may be transmitted to the software that generates the access request, to notify the software that generates the access request of an execution status of the access request generated by the software. There may be two types of the execution result of the access request. One is that execution of the access request has been completed, and the other is that execution of the access request has been not completed.

Figure 11:
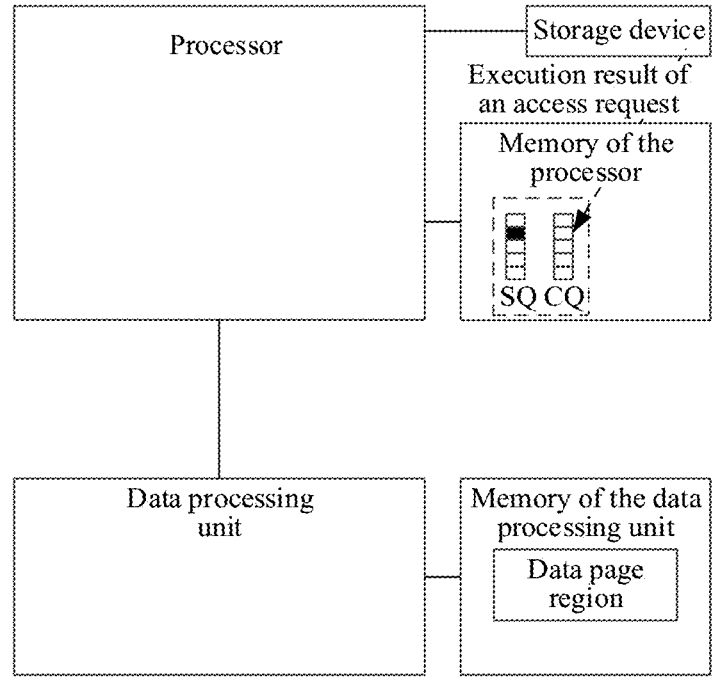
FIG. 11 shows an example in which a storage device writes an execution result of an access request into a second cache queue according to an embodiment of this disclosure.

FIG. 11 shows an example in which the storage device writes the execution result of the access request into the second cache queue according to an embodiment of this disclosure. As shown in FIG. 11, the storage device may convert the execution result of the access request into a form of a CQ (the second cache queue) entry (CQE). The entry obtained through conversion may include an identifier and the like. Different types of the identifier may correspond to different execution results. For example, an identifier "1" may indicate that an entry having the identifier is an entry indicating that execution of the access request has been completed, and an identifier "0" may indicate that an entry having the identifier is an entry indicating that execution of the access request has not been completed. The second cache queue may include a plurality of entries. When the execution result of the access request is written into the second cache queue of the processor, the entry obtained through conversion based on the execution result of the access request may be written into a location of a specific entry (for example, an entry at a tail of the queue) in the second cache queue of the processor in the DMA manner.

When each host-side storage device corresponds to one first cache queue, each host-side storage device may further correspond to one second cache queue. In this case, each second cache queue may also include an identifier of a storage device corresponding to the second cache queue. When the execution result of the access request is written into the second cache queue of the processor, the second cache queue with the same identifier may be found from a plurality of second cache queues based on the identifier included in the access request, and then the execution result of the access request is written into the second cache queue.

Step S8: The DPU obtains the execution result of the access request from the second cache queue of the processor.

Figure 12:
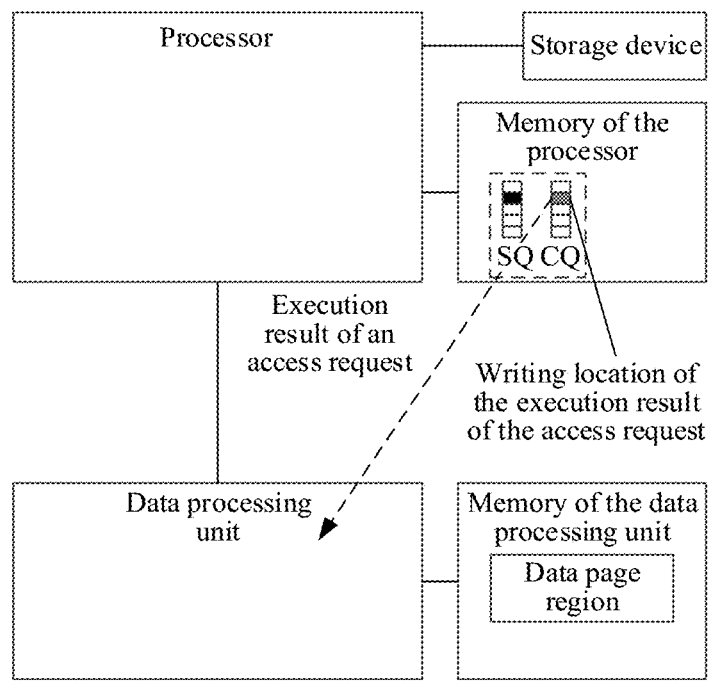
FIG. 12 shows an example in which a DPU obtains an execution result of an access request according to an embodiment of this disclosure.

FIG. 12 shows an example in which the DPU obtains the execution result of the access request according to an embodiment of this disclosure.

For example, in step S7, the storage device writes the execution result of the access request into the second cache queue of the processor, and during writing, the DPU is not notified of the write operation. Therefore, for the DPU, an update time of the second cache queue of the processor is unknown. To obtain the execution result of the access request, as shown in FIG. 12, the DPU may be set to monitor, at intervals of a preset time period, whether the second cache queue of the processor is updated. When detecting that an execution result of a newly written access request appears in the second cache queue, the DPU obtains the execution result of the access request. The DPU may transmit the execution result to the software that generates the access request. The DPU does not need to cache the execution result of the access request, so that occupation of a storage space of the DPU can be reduced.

Figure 13:
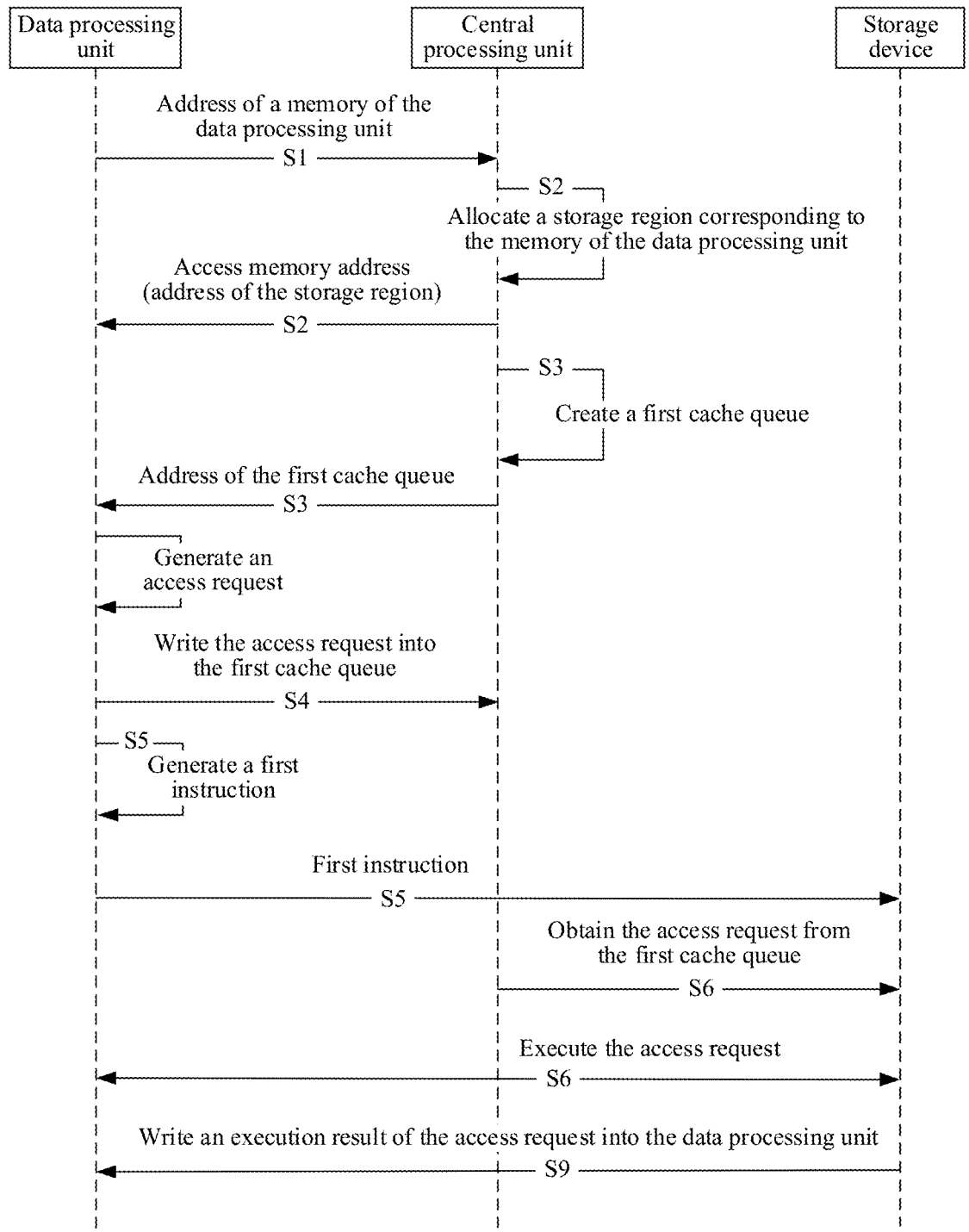
FIG. 13 shows another example working procedure of a computing device according to an embodiment of this disclosure.

FIG. 13 shows another example working procedure of a computing device according to an embodiment of this disclosure. As shown in FIG. 13, for steps S1 to S6, refer to related descriptions of steps S1 to S6 in FIG. 4, and a part related to the second cache queue is deleted. Details are not described herein again.

Figure 14:
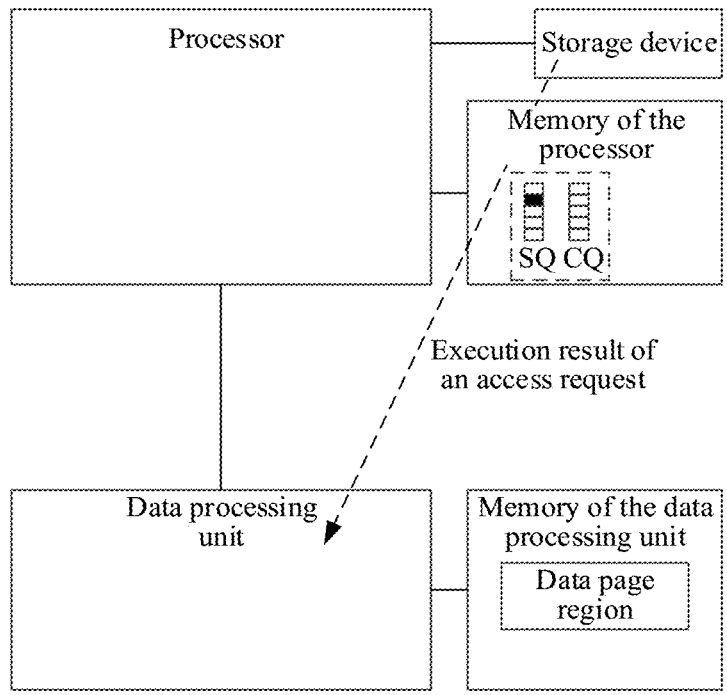
FIG. 14 shows an example in which a storage device writes an execution result of an access request into a DPU according to an embodiment of this disclosure.

After step S6 is completed, the computing device may perform step S9: A storage device writes an execution result of an access request into a DPU in a PCIe point-to-point transmission mode. FIG. 14 shows an example in which the storage device writes the execution result of the access request into the DPU according to an embodiment of this disclosure.

For example, in step S6, after executing the access request, the storage device may generate one execution result of the access request. As shown in FIG. 14, when the DPU has a function of caching the execution result of the access request, the execution result of the access request may be directly written into the DPU in the PCIe point-to-point transmission mode. For example, a storage region may be spared in the storage space of the DPU, to cache the execution result of the access request. It may be set that interruption is generated to notify the DPU when stored content of the region is updated, or the DPU may be set to poll the region to monitor whether the stored content is updated. The interruption and polling may be implemented based on the other technology. When an execution result of a newly written access request enables the stored content to be updated, the DPU may find the execution result of the newly written access request, and transmit the execution result to software that generates the access request. The execution result of the access request does not need to be transmitted via a processor, so that efficiency of obtaining the execution result of the access request by the DPU can be improved.

Figure 15:
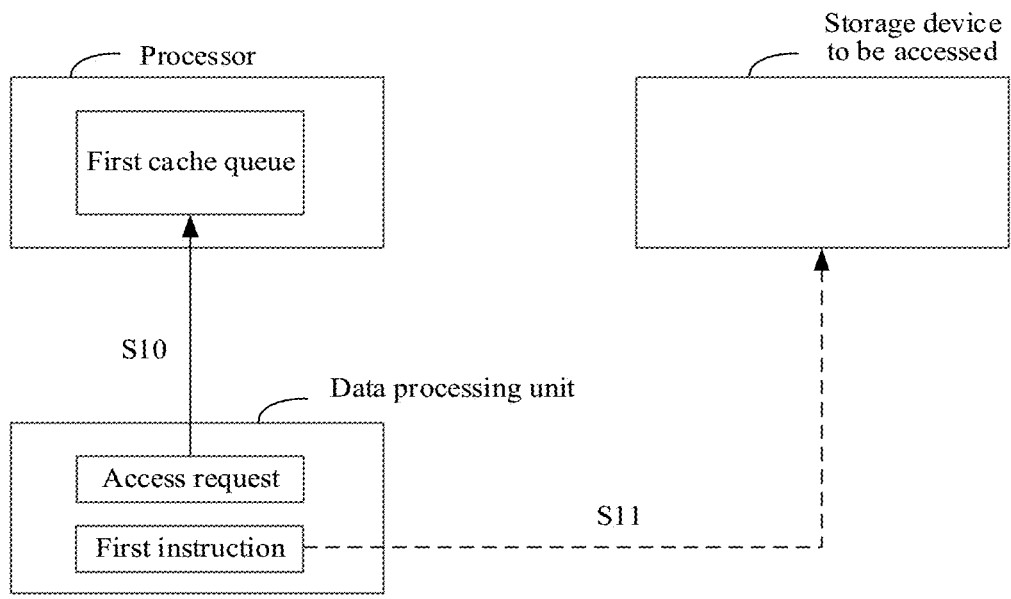
FIG. 15 shows a schematic diagram of an example working procedure of a data access method according to an embodiment of this disclosure.

FIG. 15 shows a schematic diagram of an example working procedure of a data access method according to an embodiment of this disclosure.

As shown in FIG. 15, this embodiment of this disclosure proposes the data access method. The method is performed by a DPU connected to a processor, and the method includes steps S10 and S11.

Step S10: Write an access request into a first cache queue of the processor, where the access request includes an identifier of a storage device to be accessed, and the storage device is connected to the processor and not directly connected to the DPU.

Step S11: Send, in a PCIe point-to-point transmission mode, a first instruction to the storage device to which the identifier of the storage device points, where the first instruction includes location information of the access request in the first cache queue, and the first instruction instructs the storage device to obtain the access request from the first cache queue and execute the access request.

For an example implementation of step S10, refer to the foregoing and related descriptions of step S4 in FIG. 4 and FIG. 13. For an example implementation of step S11, refer to the foregoing and related descriptions of step S5 in FIG. 4 and FIG. 13.

According to the data access method in this embodiment of this disclosure, the DPU is first used to write, into the first cache queue of the processor, the access request including the identifier of the storage device to be accessed, so that the access request may be stored in the first cache queue of the processor. Then the first instruction is sent, in the PCIe point-to-point transmission mode, to the storage device to which the identifier of the storage device points, so that the storage device to be accessed can receive the first instruction. The first instruction includes the location information of the access request in the first cache queue, and the first instruction instructs the storage device to obtain the access request from the first cache queue and execute the access request, so that after receiving the first instruction, the storage device can obtain the access request from a corresponding location in the first cache queue and execute the access request according to an instruction of the first instruction. In this manner, when the storage device is connected to the processor and not directly connected to the DPU, the DPU does not need to access the storage device via the processor of a host, and can directly access the storage device connected to the processor, so that resources of the host are not occupied. In addition, this access manner can simplify a hardware connection manner and reduce hardware design complexity.

In a possible implementation, the access request further includes a type of the access request and an access memory address, the access memory address is an address allocated by the processor to a memory of the DPU, the type of the access request indicates that the access request is a read request or a write request, and the access memory address is an address accessible to the storage device. For the access request, refer to the example of the access request in the foregoing and related descriptions in FIG. 8.

In this manner, when obtaining the access request from the first cache queue, the storage device may determine the type of the access request and address information of an access object, so that whether to perform a read operation or a write operation can be determined based on the type of the access request, and when executing the access request, data access by the DPU to the storage device of a corresponding operation type is completed based on the address information of the access object.

In a possible implementation, the method further includes: obtaining an execution result of the access request from a second cache queue of the processor. For an example implementation, refer to the foregoing and related descriptions of step S8 in FIG. 4 and the foregoing and related descriptions in FIG. 12.

Because the DPU is connected to the processor, the DPU can obtain the execution result of the access request from the second cache queue of the processor, to determine an execution status of the access request. The DPU does not need to cache the execution result of the access request, so that occupation of a storage space of the DPU can be reduced.

In a possible implementation, the method further includes: receiving an execution result that is of the access request and that is transmitted by the storage device in the PCIe point-to-point transmission mode. For an example implementation, refer to the foregoing and related descriptions of step S9 in FIG. 13, and the foregoing and related descriptions in FIG. 14.

In this manner, the execution result of the access request does not need to be transmitted by the storage device to the DPU via the processor, but is directly transmitted by the storage device to the DPU. This can improve transmission efficiency of the execution result of the access request.

In a possible implementation, the method further includes: transmitting the address of the memory of the DPU to the processor; and receiving the access memory address from the processor. For an example implementation of transmitting the address of the memory of the DPU to the processor, refer to the foregoing and related descriptions of step S1 in FIG. 4 and FIG. 13, and the foregoing and related descriptions in FIG. 5. For an example implementation of receiving the access memory address from the processor, refer to the foregoing and related descriptions of step S2 in FIG. 4 and FIG. 13, and the foregoing and related descriptions in FIG. 6.

In this manner, the DPU may obtain the access memory address accessible to the storage device, so that the access memory address can be used as an address for the DPU to transmit data in the PCIe point-to-point transmission mode and it is possible that the DPU and the storage device transmit data when the DPU and the storage device are not directly connected to each other.

In a possible implementation, the method further includes: receiving addresses of the first cache queue and the second cache queue that are sent by the processor, where the address of the first cache queue is used to write the access request into the first cache queue of the processor, and the address of the second cache queue is used to obtain the execution result of the access request from the second cache queue. For an example implementation, refer to the foregoing and related descriptions of step S3 in FIG. 4, and the foregoing and related descriptions in FIG. 7.

In this manner, the DPU can find the first cache queue based on the received address of the first cache queue, and when writing the access request into the first cache queue, the DPU may directly write the access request. The DPU can find the second cache queue based on the received address of the second cache queue, and when obtaining the execution result of the access request from the second cache queue, the DPU can directly obtain the execution result of the access request. Therefore, real-time performance and accuracy of writing the access request and obtaining the access request result are ensured.

Figure 16:
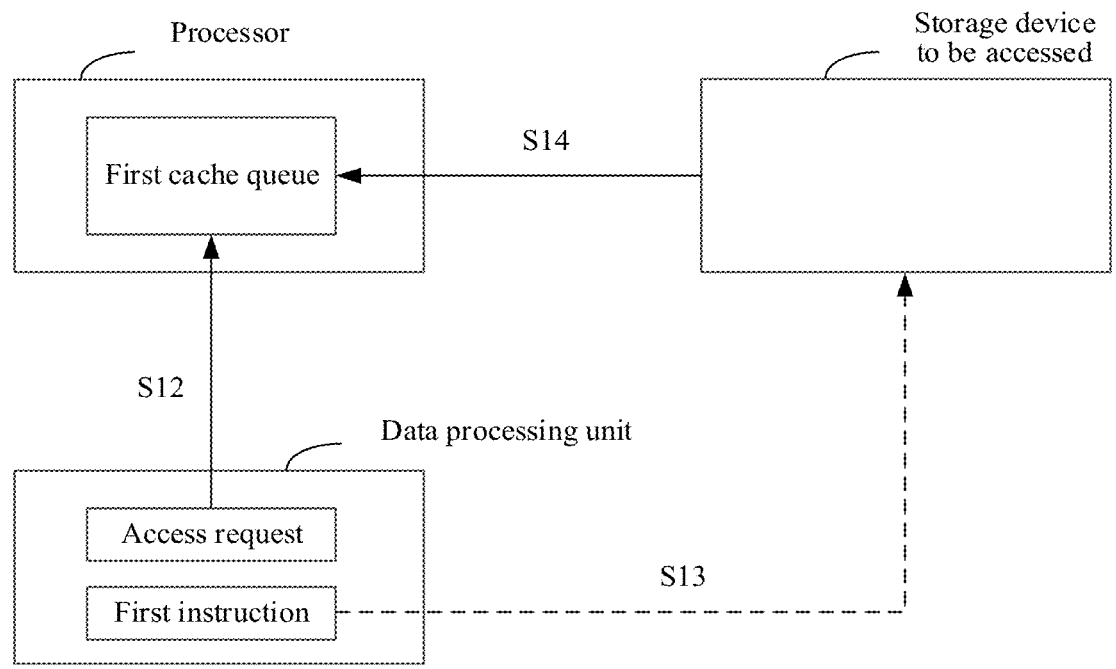
FIG. 16 shows a schematic diagram of an example working procedure of a data access method according to an embodiment of this disclosure.

FIG. 16 shows a schematic diagram of an example working procedure of a data access method according to an embodiment of this disclosure.

As shown in FIG. 16, this disclosure proposes the data access method. The method is applied to a computing device. The computing device includes a processor, a storage device connected to the processor, and a DPU connected to the processor and not directly connected to the storage device. The method includes steps S12 to S14.

Step S12: The DPU writes an access request into a first cache queue of the processor, where the access request includes an identifier of the storage device to be accessed.

Step S13: The DPU sends, in a PCIe point-to-point transmission mode, a first instruction to the storage device to which the identifier of the storage device points, where the first instruction instructs a location of the access request in the first cache queue.

Step S14: The storage device obtains the access request from the first cache queue and executes the access request according to the first instruction.

For an example implementation of step S12, refer to the foregoing and related descriptions of step S4 in FIG. 4 and FIG. 13. For an example implementation of step S13, refer to the foregoing and related descriptions of step S5 in FIG. 4 and FIG. 13. For an example implementation of step S14, refer to the foregoing and related descriptions of step S6 in FIG. 4 and FIG. 13.

According to the data access method in this embodiment of this disclosure, the DPU is first used to write, into the first cache queue of the processor, the access request including the identifier of the storage device to be accessed, so that the access request may be stored in the first cache queue of the processor. Then the DPU is used to send, in the PCIe point-to-point transmission mode, the first instruction to the storage device to which the identifier of the storage device points, so that the storage device to be accessed can receive the first instruction. The first instruction includes location information of the access request in the first cache queue, and the first instruction instructs the storage device to obtain the access request from the first cache queue and execute the access request, so that after receiving the first instruction, the storage device can obtain the access request from a corresponding location in the first cache queue and execute the access request according to an instruction of the first instruction. In this manner, in the computing device, when the storage device is connected to the processor and not directly connected to the DPU, the computing device does not need to access the storage device via the processor of a host, and can directly access the storage device connected to the processor, so that resources of the host are not occupied. In addition, this access manner can simplify a hardware connection manner and reduce hardware design complexity.

In a possible implementation, the access request further includes an access memory address, the access memory address is an address allocated by the processor to a memory of the DPU, and the access memory address is an address accessible to the storage device. In step S14, executing the access request includes: the storage device writes data into the memory of the DPU or reads data from the memory of the DPU based on the access memory address in the PCIe point-to-point transmission mode.

For the access memory address, refer to the example of the access memory address in the foregoing and related descriptions in FIG. 6. For an example implementation in which the storage device writes data into the memory of the DPU or reads data from the memory of the DPU, refer to the foregoing and related descriptions of step S6 in FIG. 4 and FIG. 13.

In this manner, the storage device can find an access object, that is, the memory of the DPU, based on the access memory address, so that the access request can be executed to write data into the memory of the DPU or read data from the memory of the DPU, to complete access by the memory of the DPU to the storage device.

In a possible implementation, the access request further includes a type of the access request, and the type of the access request indicates that the access request is a read request or a write request. When the access request is the read request, executing the access request includes: reading data from the storage device based on the access request, and writing, into the memory of the DPU based on the access memory address in the PCIe point-to-point transmission mode, the data read from the storage device. When the access request is the write request, executing the access request includes: obtaining, from the memory of the DPU based on the access memory address in the PCIe point-to-point transmission mode, data to be written into the storage device, and writing the obtained data into the storage device.

For the type of the access request, refer to the example of the type of the access request in the foregoing and the related descriptions in FIG. 8. When the access request is the read request or the write request, for an example implementation of the execution of the access request, refer to the foregoing and related descriptions of step S6 in FIG. 4 and FIG. 13.

When the access request is the read request, the storage device can write data into the memory of the DPU, which is equivalent to reading the storage device by the memory of the DPU. When the access request is the write request, the storage device can read data from the memory of the DPU, which is equivalent to writing the storage device by the memory of the DPU. In this manner, corresponding to different types of the access request, the storage device can respond to different operations that meet a requirement of the access request.

In a possible implementation, the method further includes: the DPU sends the address of the memory of the DPU to the processor. The processor allocates the access memory address to the memory of the DPU based on the address of the memory of the DPU. The processor sends the access memory address to the DPU. For an example implementation, refer to the foregoing and related descriptions of steps S1 and S2 in FIG. 4 and FIG. 13.

In this manner, the processor may allocate the access memory address to the memory of the DPU, so that the access memory address can be used as an address for the DPU to transmit data in the PCIe point-to-point transmission mode and it is possible that the DPU and the storage device transmit data when the DPU and the storage device are not directly connected to each other. Allocating the access memory address to the memory of the DPU and sending the access memory address may be performed in a configuration phase, so that the access memory address is directly used after software in the DPU generates the access request. This can improve efficiency of executing the access request by the computing device.

In a possible implementation, the method further includes: the storage device writes an execution result of the access request into a second cache queue of the processor. The DPU obtains the execution result of the access request from the second cache queue of the processor. For an example implementation, refer to the foregoing and related descriptions of steps S7 and S8 in FIG. 4.

In a possible implementation, the method further includes: the DPU receives an execution result that is of the access request and that is transmitted by the storage device in the PCIe point-to-point transmission mode. For an example implementation, refer to the foregoing and related descriptions of step S9 in FIG. 13.

In a possible implementation, the method further includes: receiving addresses of the first cache queue and the second cache queue that are sent by the processor, where the address of the first cache queue is used to write the access request into the first cache queue of the processor, and the address of the second cache queue is used to obtain the execution result of the access request from the second cache queue. For an example implementation, refer to the foregoing and related descriptions of step S3 in FIG. 4, and the foregoing and related descriptions in FIG. 7.

In this manner, the DPU can find the first cache queue based on the received address of the first cache queue, so that the DPU can accurately and quickly perform operations of writing the access request into the first cache queue and obtaining the execution result of the access request from the second cache queue. Creation of the first cache queue and the second cache queue and sending of the addresses of the first cache queue and the second cache queue may be performed in the configuration phase, so that the addresses of the first cache queue and the second cache queue are directly used after the software in the DPU generates the access request. This can improve the efficiency of executing the access request by the computing device.

Figure 17:
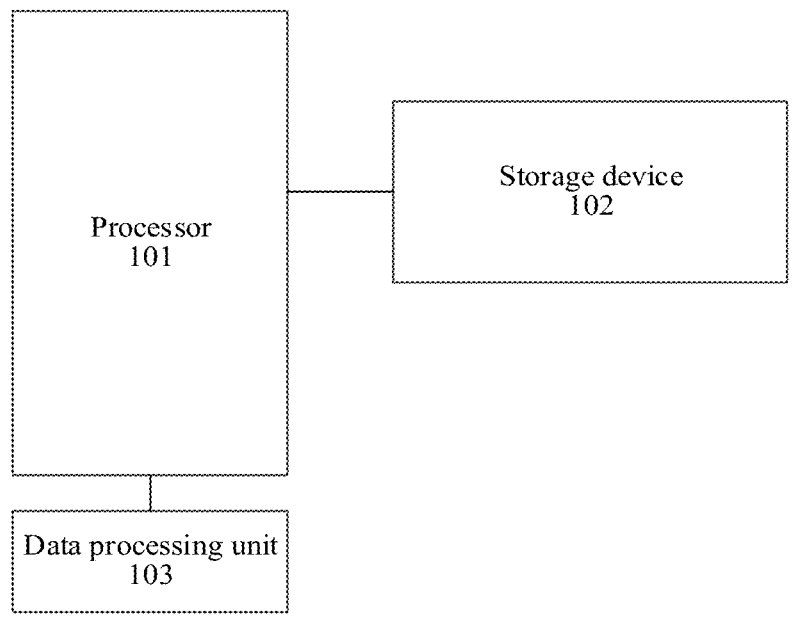
FIG. 17 shows a schematic structural diagram of a computing device according to an embodiment of this disclosure.

FIG. 17 shows a schematic structural diagram of a computing device according to an embodiment of this disclosure.

As shown in FIG. 17, this embodiment of this disclosure further provides the computing device, including: a processor 101; a storage device 102, connected to the processor 101; and a DPU 103, connected to the processor 101 and not directly connected to the storage device 102, and configured to: write an access request into a first cache queue of the processor 101, where the access request includes an identifier of the storage device 102 to be accessed; and send, in a PCIe point-to-point transmission mode, a first instruction to the storage device 102 to which the identifier of the storage device points, where the first instruction instructs a location of the access request in the first cache queue. For an example implementation, refer to the foregoing and related descriptions of steps S4 and S5 in FIG. 4 and FIG. 13, and related descriptions in FIG. 8 and FIG. 9.

The storage device 102 is configured to obtain the access request from the first cache queue and execute the access request according to the first instruction. For an example implementation, refer to the foregoing, related descriptions of step S6 in FIG. 4 and FIG. 13, and related descriptions in FIG. 10.

For the processor 101, refer to the example of the CPU in FIG. 3. For the storage device 102, refer to the example of the storage device HDD/SSD and the NVMe SSD in FIG. 3. For the DPU 103, refer to the example of the DPU in FIG. 3.

In a possible implementation, the access request further includes an access memory address, the access memory address is an address allocated by the processor 101 to a memory of the DPU 103, and the access memory address is an address accessible to the storage device 102.

The storage device 102 is configured to write data into the memory of the DPU 103 or read data from the memory of the DPU 103 based on the access memory address in the PCIe point-to-point transmission mode.

In a possible implementation, the access request further includes a type of the access request, and the type of the access request indicates that the access request is a read request or a write request.

When the access request is the read request, the storage device 102 is configured to: read data from the storage device 102 based on the access request, and write, into the memory of the DPU 103 based on the access memory address in the PCIe point-to-point transmission mode, the data read from the storage device 102.

When the access request is the write request, the storage device 102 is configured to: obtain, from the memory of the DPU 103 based on the access memory address in the PCIe point-to-point transmission mode, data to be written into the storage device 102, and write the obtained data into the storage device 102.

In a possible implementation, the processor 101 is configured to: receive the address that is of the memory of the DPU 103 and that is sent by the DPU 103; allocate the access memory address to the memory of the DPU 103 based on the address of the memory of the DPU 103; and send the access memory address to the DPU 103.

In a possible implementation, the DPU 103 is configured to obtain an execution result of the access request from a second cache queue of the processor 101.

In a possible implementation, the DPU 103 is configured to receive an execution result that is of the access request and that is transmitted by the storage device 102 in the PCIe point-to-point transmission mode.

The computing device may include at least one of a desktop computer, a laptop computer, a handheld computer, a notebook computer, an ultra-mobile personal computer (UMPC), a netbook, a personal digital assistant (PDA), an augmented reality (AR) device, a virtual reality (VR) device, an artificial intelligence (AI) device, a wearable device, a vehicle-mounted device, a smart home device, a smart city device, and a server device. A specific type of the computing device is not specially limited in this embodiment of this disclosure.

The computing device may include the processor 101, the storage device 102, and the DPU 103. It may be understood that, a structure illustrated in this embodiment of this disclosure does not constitute a specific limitation on the computing device. In some other embodiments in this disclosure, the computing device may include more or fewer components than those shown in the figure, or some components may be combined, or some components may be separated, or different component arrangement may be used. The components shown in the figure may be implemented by hardware, software, or a combination of software and hardware.

An embodiment of this disclosure provides a non-volatile computer-readable storage medium, where the non-volatile computer-readable storage medium stores computer program instructions. When the computer program instructions are executed by a processor, the foregoing method is implemented.

An embodiment of this disclosure provides a computer program product including computer-readable code or a non-volatile computer-readable storage medium carrying the computer-readable code. When the computer-readable code is run in a processor of an electronic device, the processor in the electronic device performs the foregoing method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random-access memory (RAM), a read-only memory (ROM), an erasable programmable read-only memory (EPROM) or flash memory, a static random-access memory (SRAM), a portable compact disc read-only memory (CD-ROM), a digital versatile disc (DVD), a memory stick, a floppy disk, a mechanical coding device, for example, a punching card or a groove protrusion structure that stores instructions, and any suitable combination thereof.

The computer-readable program instructions or code described herein may be downloaded from the computer-readable storage medium to each computing/processing device, or downloaded to an external computer or an external storage device over a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives computer-readable program instructions from the network, and forwards the computer-readable program instructions for storage in the computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in one or more programming languages or any combination thereof. The programming languages include an object-oriented programming language such as Smalltalk and C++, and another procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. When the remote computer is involved, the remote computer may be connected to the user computer over any type of network, including a local area network (LAN) or a wide area network (WAN), or may be connected to an external computer (for example, connected via an Internet service provider over the Internet). In some embodiments, an electronic circuit, for example, a programmable logic circuit, a field-programmable gate array (FPGA), or a programmable logic array (PLA), is customized via status information of the computer-readable program instructions. The electronic circuit may execute the computer-readable program instructions, to implement various aspects of this disclosure.

The various aspects of this disclosure are described herein with reference to the flowcharts and/or the block diagrams of the method, the apparatus (system), and the computer program product according to embodiments of this disclosure. It should be understood that each block in the flowcharts and/or the block diagrams and a combination of blocks in the flowcharts and/or the block diagrams may all be implemented by the computer-readable program instructions.

The flowcharts and the block diagrams in the accompanying drawings illustrate system architectures, functions, and operations of possible implementations of apparatuses, systems, methods, and computer program products according to a plurality of embodiments of this disclosure. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and the combination of blocks in the block diagrams and/or the flowcharts may be implemented by hardware (for example, a circuit or an application-specific integrated circuit (ASIC) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this disclosure are described above. The foregoing descriptions are examples, are not exhaustive, and are not limited to the disclosed embodiments. Many modifications and changes are clear to a person of ordinary skill in the art without departing from the scope of the described embodiments. The selection of terms used in this specification is intended to best explain principles of embodiments, practical applications, or improvements to technologies in the market, or to enable another person of ordinary skill in the art to understand embodiments disclosed herein.

What is claimed is:

1. A method, comprising:
   writing, through a Peripheral Component Interconnect Express (PCIe) connection between a data processing unit (DPU) and a processor and into a first cache queue of the processor, an access request comprising an identifier of a storage device that is to be accessed, is connected to the processor, and is not directly connected to the DPU; and
   sending, through the PCIe connection between the DPU and the processor, in a PCIe point-to-point transmission mode, and to the storage device, a first instruction comprising location information of the access request in the first cache queue, wherein the first instruction instructs the storage device to obtain the access request from the first cache queue and to execute the access request.

2. The method of claim 1, wherein the access request further comprises a type of the access request and an access memory address, wherein the access memory address is allocated by the processor to a memory of the DPU, wherein the type indicates that the access request is a read request or a write request, and wherein the access memory address is accessible to the storage device.

3. The method of claim 2, further comprising:
   transmitting, to the processor, the access memory address; and
   receiving, from the processor, the access memory address.

4. The method of claim 1, further comprising obtaining, from a second cache queue of the processor, an execution result of the access request.

5. The method of claim 1, further comprising receiving, from the storage device and in the PCIe point-to-point transmission mode, an execution result of the access request.

6. A method, comprising:
   writing, by a data processing unit (DPU) of a computing device, through a Peripheral Component Interconnect Express (PCIe) connection between the DPU of the computing device and a processor of the computing device, and into a first cache queue of the processor of the computing device, an access request comprising an identifier of a storage device of the computing device to be accessed;
   sending, by the DPU, through the PCIe connection between the PCIe connection between the DPU of the computing device and the processor of the computing device, in a PCIe point-to-point transmission mode, and to the storage device, a first instruction comprising a location of the access request in the first cache queue;
   obtaining, by the storage device and from the first cache queue, the access request; and
   executing, by the storage device and according to the first instruction, the access request.

7. The method of claim 6, wherein the access request further comprises an access memory address, wherein the access memory address is allocated by the processor to a memory of the DPU, wherein the access memory address is accessible to the storage device, and wherein executing the access request comprises writing, by the storage device, based on the access memory address, and in the PCIe point-to-point transmission mode, data into the memory of the DPU or reading data from the memory of the DPU.

8. The method of claim 7, wherein the access request further comprises a type of the access request, wherein the type indicates that the access request is a read request or a write request, wherein when the access request is the read request, executing the access request comprises:
   reading, from the storage device and based on the access request, first data; and
   writing, into the memory, based on the access memory address, and in the PCIe point-to- point transmission mode, the first data, and
   wherein when the access request is the write request, executing the access request comprises:
      obtaining, from the memory, based on the access memory address, and in the PCIe point-to-point transmission mode, second data to be written into the storage device; and
      writing, into the storage device, the second data.

9. The method of claim 7, further comprising:
   sending, by the DPU and to the processor, an address of the memory;
   allocating, by the processor, to the memory, and based on the address, the access memory address; and
   sending, by the processor and to the DPU, the access memory address.

10. The method of claim 6, further comprising:
    writing, by the storage device and into a second cache queue of the processor, an execution result; and
    obtaining, by the DPU and from the second cache queue, the execution result.

11. The method of claim 6, further comprising receiving, by the DPU, from the storage device, and in the PCIe point-to-point transmission mode, an execution result of the access request.

12. A computing device, comprising:
    a processor;
    a storage device connected to the processor; and
    a data processing unit (DPU) connected through a Peripheral Component Interconnect Express (PCIe) connection to the processor, not directly connected to the storage device, and configured to:
       write, through the PCIe connection between the DPU and the processor and into a first cache queue of the processor, an access request comprising an identifier of the storage device; and
       send, through the PCIe connection between the DPU and the processor, in a PCIe point-to-point transmission mode, and to the storage device, a first instruction comprising location information of the access request in the first cache queue,
    wherein the storage device is configured to:
       obtain, from the first cache queue, the access request; and
       execute, according to the first instruction, the access request.

13. The computing device of claim 12, wherein the access request further comprises an access memory address, wherein the access memory address is allocated by the processor to a memory of the DPU, wherein the access memory address is accessible to the storage device, and wherein the storage device is configured to:

write, based on the access memory address, into the memory, and in the PCIe point-to-point transmission mode, data; or read, from the memory, based on the access memory address, and in the PCIe point-to-point transmission mode, the data.

14. The computing device of claim 13, wherein the access request further comprises a type of the access request, wherein the type indicates that the access request is a read request or a write request, wherein when the access request is the read request, the storage device is further configured to:

read, from the storage device and based on the access request, first data; and write, into the memory, based on the access memory address, and in the PCIe point-to-point transmission mode, the first data, and wherein when the access request is the write request, the storage device is further configured to:

obtain, from the memory, based on the access memory address, and in the PCIe point-to-point transmission mode, second data to be written into the storage device; and write, into the storage device, the second data.

15. The computing device of claim 13, wherein the processor is configured to:

receive, from the DPU, an address of the memory;

allocate, based on the address and to the memory, the access memory address; and send, to the DPU, the access memory address.

16. The computing device of claim 12, wherein the DPU is configured to obtain, from a second cache queue of the processor, an execution result of the access request.

17. The computing device of claim 12, wherein the DPU is configured to receive, from the storage device and in the PCIe point-to-point transmission mode, an execution result of the access request.

18. The computing device of claim 12, wherein the PCIe connection between the DPU and the processor comprises a PCIe cable connecting the DPU and the processor.

19. The computing device of claim 12, wherein the DPU is further configured to run distributed storage software to provide a data storage service in a user virtual machine.

20. The computing device of claim 19, wherien the processor is configured to provide application software in the user virtual machine.

21. The computing device of claim 12, wherein the processor comprises a central processing unit (CPU), wherein the computing device further comprises:

a first PCIe cable connecting the DPU and the CPU; and a second PCIE cable connecting the CPU and the storage device, and wherein the DPU is not directly connected to the storage device.

* * * * *